United States Patent

Jackson et al.

[15] 3,673,058
[45] June 27, 1972

[54] HONEYCOMB HAVING LAMINATES OF UNIDIRECTIONAL STRANDS

[72] Inventors: Wendell T. Jackson, Walnut Creek; Beverley R. Garrett, Moraga; Earl C. Vicars, Orinda, all of Calif.

[73] Assignee: Hexcel Corporation, Dublin, Calif.

[22] Filed: April 7, 1969

[21] Appl. No.: 814,021

[52] U.S. Cl. ............................................ 161/68, 161/143
[51] Int. Cl. .................................................. B32b 3/12
[58] Field of Search .................... 161/57, 58, 59, 68, 69, 88, 161/89, 142, 143, 227, DIG. 4, 402, 60; 244/123; 156/197; 52/615, 618; 29/455 LM

[56] References Cited

UNITED STATES PATENTS

| | | | |
|---|---|---|---|
| 2,655,978 | 10/1953 | Gonda et al. | 156/201 |
| 2,682,292 | 6/1954 | Nagin | 156/187 |
| 2,787,570 | 4/1957 | Lott et al. | 161/143 X |
| 2,803,576 | 8/1957 | Donaldson | 161/59 X |
| 3,145,000 | 8/1964 | Mackie | 244/123 |
| 3,244,570 | 4/1966 | Boggs | 161/143 X |
| 3,314,841 | 4/1967 | Romanin | 161/143 X |
| 3,490,983 | 1/1970 | Lee | 161/59 |
| 2,477,852 | 8/1949 | Bacon | 161/68 |
| 2,744,042 | 5/1956 | Pace | 161/68 X |
| 3,077,000 | 2/1963 | Huisman et al. | 18/19 |
| 3,300,354 | 1/1967 | Duft | 156/169 |
| 3,321,355 | 5/1967 | Holland | 161/68 |
| 3,391,050 | 7/1968 | Nebesar | 161/60 X |

FOREIGN PATENTS OR APPLICATIONS 845,744  8/1960  Great Britain .................... 161/143

Primary Examiner—Robert F. Burnett
Assistant Examiner—Henry F. Epstein
Attorney—Townsend and Townsend

[57] ABSTRACT

A honeycomb core constructed of a plurality of generally sinusoidally shaped ribbons which are bonded together to define honeycomb cells. Each ribbon includes at least one layer of adjacent, unidirectionally oriented strands which are bonded together.

5 Claims, 10 Drawing Figures

PATENTED JUN 27 1972 3,673,058
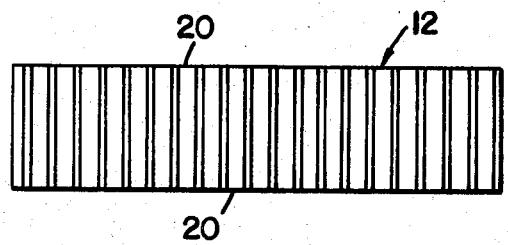
FIG_1
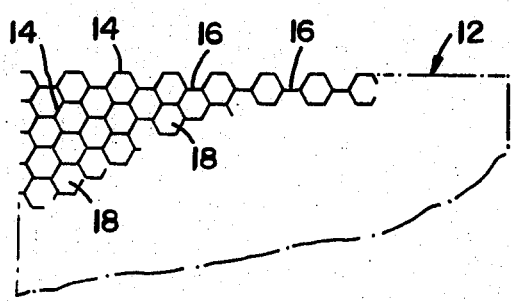
FIG_2
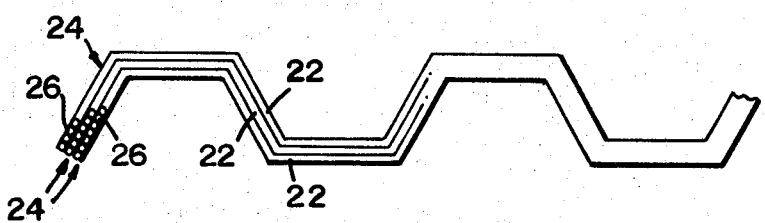
FIG_3
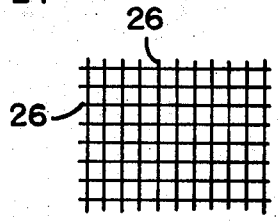
FIG_4
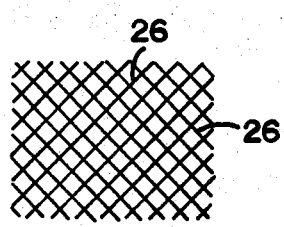
FIG_5
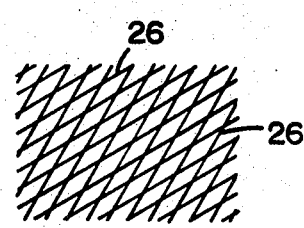
FIG_6
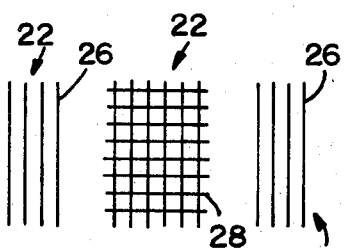
FIG_7
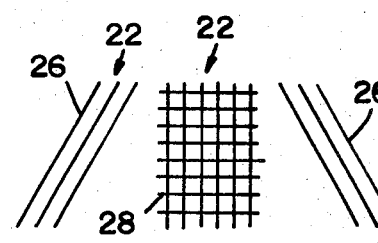
FIG_8
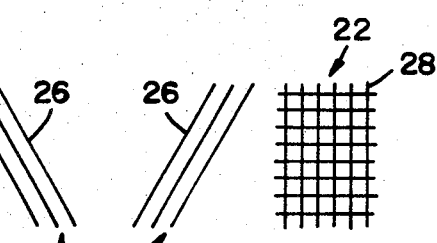
FIG_10
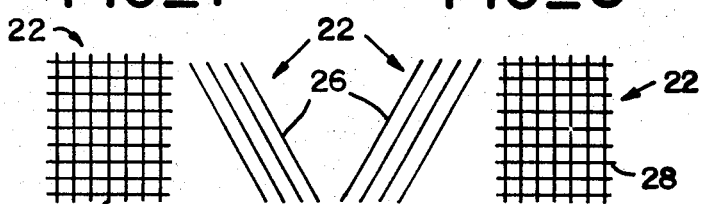
FIG_9
INVENTORS
WENDELL T. JACKSON
BEVERLEY R. GARRETT
BY  EARL C. VICARS
Townsend and Townsend
ATTORNEYS

HONEYCOMB HAVING LAMINATES OF UNIDIRECTIONAL STRANDS

BACKGROUND OF THE INVENTION

Today honeycomb is in extensive use for a large number of applications. Depending upon the end use of the honeycomb it is constructed of various materials such as metallic foil, impregnated paper, or a plastic or resinous material reinforced with strands such as yarns.

Reinforced plastic honeycomb as such is known. In the past, reinforced plastic honeycomb was fabricated from one or more layers of a woven fabric bonded together with a resinous or plastic material. Such honeycomb cores have a number of uses and desirable features, not the least of which are lightweight and low cost.

Although such reinforced plastic honeycomb cores are entirely satisfactory for many applications, today's increasing stress requirements coupled with the necessity for low weight have made such reinforced honeycomb unusable for certain applications. The woven fabric employed in the cores is an array of a large number of undulated yarns rigidified by the bonding material. When the core is subjected to external forces, the undulations over the length of the yarn cause substantial bending moments over the various longitudinal segments of the yarns. This increases the stresses to which such forces subject each yarn and, consequently, reduce the overall strength as well as compressive modulus of the ribbon and the honeycomb core.

To provide prior art honeycomb cores with the strength required in many of today's applications, the ribbons of the core have to be appreciably thickened to prevent their failure. This in turn results in a weight penalty which is often unacceptable or, at least, highly undesirable.

SUMMARY OF THE INVENTION

The present invention provides a honeycomb core constructed of a plurality of generally sinusoidally formed ribbons bonded together at adjacent nodes to define cell openings. Each ribbon includes a layer of unidirectionally oriented, adjacent strands which are bonded together.

The strands are maintained straight over their length except to the extent they follow the configuration of the ribbon. As compared to prior art, woven fabric plastic reinforced honeycomb cores constructed according to this invention eliminate the disadvantages from undulated strands. Thus, the strands can be stressed to the fullest extent without subjecting them to undesirable bending moments so that the strength-to-weight ratio is substantially enhanced over that heretofore possible. Honeycombs constructed in accordance with this invention have been found to exhibit up to 40 percent greater strength and up to 100 percent greater shear moduli.

Accordingly, with honeycomb cores of the present invention it is possible to subject a core of a given weight to substantially higher stresses. The usefulness of honeycomb core in a host of applications, particularly in the aerospace industry, has thereby been substantially increased.

BRIEF DESCRIPTION OF THE DRAWINGS

Other objects, features, and advantages of the present invention will be more apparent after referring to the following specification and attached drawings in which:

FIG. 1 is an elevational view of a honeycomb core constructed according to the present invention;

FIG. 2 is a fragmentary plan view of the core illustrated in FIG. 1;

FIG. 3 is a fragmentary, enlarged plan view of a honeycomb core ribbon constructed according to the present invention;

FIGS. 4-6 are schematic representations of ribbons having two layers of unidirectional strands in different relative angular positions; and FIGS. 7-10 are schematic representations of ribbons similar to those illustrated in FIGS. 4-6 but show the use of unidirectional strand layers in combination with conventional fabric layers.

DESCRIPTION OF THE PREFERRED EMBODIMENT

Referring to FIGS. 1 and 2, a honeycomb core 12 is constructed of a plurality of longitudinal ribbons 14 which have a generally sinusoidal shape as is well known in the art. Adjacent ribbons are bonded together at nodes 16 whereby they define honeycomb cells 18 which have an axis transverse to the faces 20 of the core. Any desirable number of ribbons are so bonded together to construct honeycomb cores of various sizes. To use the cores they are machined, cut, shaped, etc., to give them their final configuration.

The ribbons can be constructed from a large variety of materials such as metallic foil, paper, or reinforced plastic. Prior art reinforced plastic ribbons generally comprised one or more laminates of a woven fabric filled with a resinous or plastic material. In ribbons having a plurality of such laminates the laminates are also bonded together.

FIG. 3 illustrates an enlarged ribbon 14 which is constructed of a plurality of laminates 22 bonded together by a plastic or resinous material. In a presently preferred embodiment of this invention each laminate comprises a layer 24 of non-woven strands or fabric yarns 26 which lie side by side, have a unidirectional orientation, i.e., are parallel, and are bonded together by the resinous or plastic material.

Referring to FIGS. 4-6, the orientation of yarns 26 in a ribbon constructed of two laminates is schematically illustrated. If the ribbon is assumed to longitudinally extend from the left to the right in the FIGS., FIG. 4 illustrates a ribbon in which the yarns in the first laminates are parallel to the longitudinal extent of the ribbon, and thereby are transverse to the axis of cells 18, and the yarns in the second laminate are transverse to the longitudinal extent, or parallel to cells 18. FIG. 5 illustrates a ribbon in which the angular disposition of the yarns in the two laminates is again about 90° but wherein the yarns in both laminates have an angular inclination to the longitudinal extent of the ribbon of about 45°. In FIG. 6 the angular disposition of the unidirectionally oriented yarns in the two laminates differs by less than 90°. Moreover, the laminates are angularly inclined to the longitudinal extent of the ribbon.

The preceding illustration of possible variations in the relative positioning of the yarn layers in each laminate and of the relative angular disposition of the yarns in the layers makes it clear that further combinations and variations can be achieved if desired for the particular application of a honeycomb core. The number of laminates in each ribbon can be varied. Thus, in applications requiring lesser strength of the honeycomb only one laminate may be provided for each ribbon while in high strength applications the number of laminates may be increased to three or more laminates per ribbon.

Referring to FIGS. 7-10, in another embodiment of this invention each ribbon 14 is constructed of a plurality of laminates 22 in which at least one of the laminates has a layer of adjacent, unidirectionally oriented non-woven yarns 26 which are bonded together by a resin or a plastic as described above. At least a second layer 24 of the ribbon is constructed of a conventionally woven fabric 28, the strands of which are likewise bonded together by a resin or a plastic. The laminates are further bonded together to form the ribbon. The woven fabric layer in this type of ribbon acts as a base and filler for the unidirectional yarn layers. The advantages of a significantly improved strength-to-weight ratio and shear modulus is obtained while the costs of the ribbon are kept relatively low.

Various combinations in the arrangement of the unidirectional yarn and woven fabric layers can be made. In FIG. 10 a fabric layer and a unidirectional yarn layer are provided to form a two-laminate ribbon. Although ribbons constructed as illustrated in FIG. 10 are entirely satisfactory, it is preferred that the outermost layers of the ribbons are identically constructed layers, that is that they are either fabric or unidirectional yarn layers as illustrated in FIGS. 7-9. Warpage and twisting of the ribbon, and the sheet from which the ribbon is cut are thereby prevented. The number of laminates in each ribbon can, of course, be varied over that illustrated in FIGS. 7-9.

In a further embodiment of this invention the fabric layers 28 illustrated in FIGS. 7–10 can be replaced by layers of other materials such as metallic foils, film, papers, etc. Though each influences the characteristics of the resulting ribbon and honeycomb core differently, the benefits of the present invention from employing unidirectionally oriented yarn layers are obtained, and combined with the particular characteristics obtained from the use of such materials in honeycomb.

The material for constructing yarns 26 can be chosen according to the desired ultimate characteristics of the honeycomb core. Thus, they may be constructed of glass fibers for low-cost cores, of carbon or graphite yarns for high strength applications, of asbestos or polyimide fibers for high temperature applications, etc. Similarly, the material for bonding the strands of yarn to each other can be chosen from a broad class including thermoplastic or thermosetting plastics, resins, polyimides (for high temperature application) etc. All these materials have the common characteristic that they can be applied to the strands in an essentially liquid form and can thereafter be hardened to form in conjunction with the yarns, a sheet or laminate that can be handled to fabricate ribbons, give them their sinusoidal shape, and to bond them together at the nodes to form honeycomb cores.

Strength and stress considerations make it sometimes desirable to employ ribbons having either only one laminate or laminates in which the yarns are parallel or so positioned that they can warp the ultimate ribbon and panel from which the ribbon is cut. Such warpage can be prevented by control of the twist direction in the yarns. Yarns are generally twisted in either a clockwise or counterclockwise direction, or as more commonly known in either the Z or the S direction. This twist in the yarns is responsible for warpage of the ribbons. If the ribbon comprises only a single laminate the twist of the yarns in the unidirectionally oriented yarn layer is alternated, a Z following an S twisted yarn or a plurality of Z twisted yarns following a plurality of S twisted yarns. If the ribbon is constructed of two laminates in which the yarns in the two layers are parallel the yarns in each layer are constructed of oppositely twisted yarns. Warpage of the ribbons and panels for which they are constructed is thereby prevented.

Turning to the fabrication of ribbons, it is presently preferred to wrap yarn about an elongated cylinder or mandrel so that the individual yarns lay side-by-side, tough each other and are oriented in the same direction. Thereafter, the selected resin or plastic is applied to the layer and is permitted to at least partially dry to impart some rigidity to the laminates. If several layers are required to form the ribbon, additional yarn layers are applied over the firm one or a plurality of single, bonded yarn layers are subsequently bonded together to form a multi-laminate ribbon. The orientation of the yarns is controlled to obtain the desired angular disposition between them and the various laminates.

After the resin or plastic has been at least partially dried, the resulting reinforced plastic cylinder is longitudinally slitted to form two halves, is removed from the mandrel and is flattened. To aid the removal of the reinforced plastic semicylinders from the mandrel, the latter preferably includes a nonstick coating such as teflon or an aluminum foil wrapped around the mandrel.

The flattened reinforced plastic panels are now cut into longitudinal strips, with the direction of the cuts being controlled by the angular disposition of the yarns in the panel and the required angular disposition of the yarns in the ribbon. The ribbons are then corrugated according to well-known methods and bonded together at the nodes with bonding agents, by heat sealing the ribbons to each other, or by curing them.

The strength of honeycomb cores constructed according to the present invention can be further increased by prestressing the unidirectionally oriented yarns in the various laminates. Prestressing as such is well known and has long been practiced in reinforced concrete constructions. In honeycomb cores the advantages from prestressing the reinforcing members have not been generally available. Accordingly, to prestress the yarns they are subjected to tension while wrapped over the mandrel and the tension is maintained until the plastic or resin had time to set up to maintain the yarn in the prestressed condition. A highly desirable further increase in the strength-to-weight ratio of honeycomb panels constructed according to the present invention is thereby obtained.

While one embodiment of the invention has been shown and described, it will be obvious that other adaptations and modifications can be made without departing from the true spirit and scope of the invention.

We claim:

1. A reinforced plastic honeycomb core having a high strength-to-weight ratio comprising a plurality of generally sinusoidally formed ribbons bonded together at spaced apart nodes to define honeycomb cells, each ribbon having in cross section at least one layer of parallel yarns arranged in side-by-side relation only and a binder securing the yarns in the layer to each other whereby, as compared to a honeycomb core including cross yarns and having deflected longitudinal yarns, an increase in the honeycomb strength of up to about 40 percent is obtained.

2. A honeycomb core according to claim 1 including a plurality of layers of yarns and means bonding the layers face-to-face to each other to define ribbons constructed of a plurality of layers.

3. A honeycomb core according to claim 2 wherein the yarns in the different layers are angularly inclined with respect to each other.

4. A reinforced honeycomb core having a high strength-to-weight ratio comprising a plurality of generally sinusoidally shaped ribbons bonded together at adjacent nodes and defining honeycomb cells, each ribbon comprising a first layer constructed of a plurality of parallel yarns arranged side-by-side, extending in like directions and defining a flat layer free of cross yarns, a second layer constructed of a sheet material, and means bonding the layers face-to-face to each other.

5. A honeycomb core according to claim 4 wherein the sheet material comprises a metallic material.

* * * * *